No. 639,874. Patented Dec. 26, 1899.
G. THUILLIER.
HAND SHEARS FOR CUTTING SHEET METAL.
(Application filed July 19, 1899.)
(No Model.) 2 Sheets—Sheet 1.
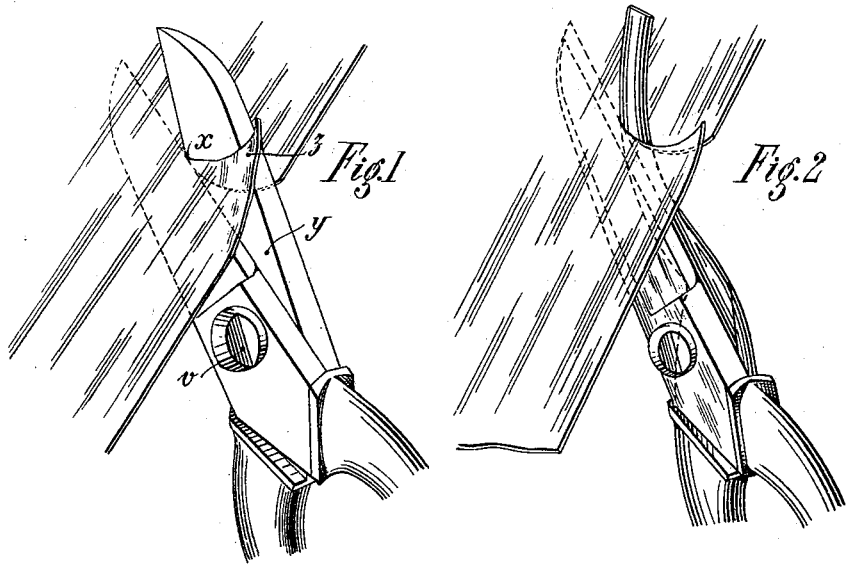
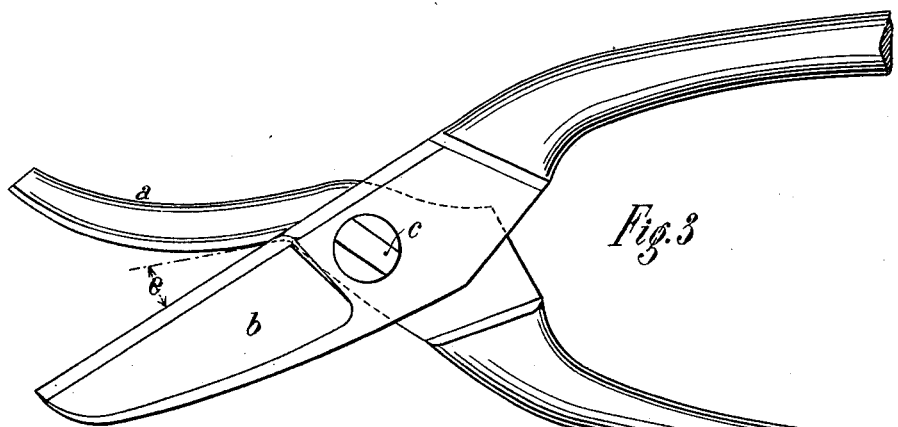
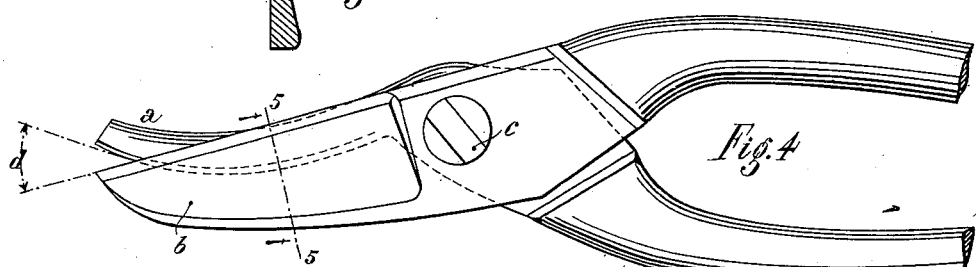
Witnesses:—
Edward Vieser
George Barry Jr.
Inventor:
Georges Thuillier
By Attorneys
Brown & Seward No. 639,874. Patented Dec. 26, 1899.
G. THUILLIER.
HAND SHEARS FOR CUTTING SHEET METAL.
(Application filed July 19, 1899.)

(No Model.) 2 Sheets—Sheet 2.

Witnesses:-
George Barry Jr
Edward Tieter.

Inventor:-
Georges Thuillier
by attorneys
Howell Seward

UNITED STATES PATENT OFFICE.

GEORGES THUILLIER, OF NOGENT-EN-BASSIGNY, FRANCE.

HAND-SHEARS FOR CUTTING SHEET METAL.

SPECIFICATION forming part of Letters Patent No. 639,874, dated December 26, 1899.

Application filed July 19, 1899. Serial No. 724,380. (No model.)

*To all whom it may concern:*

Be it known that I, GEORGES THUILLIER, manufacturer, a citizen of the Republic of France, and a resident of Nogent-en-Bassigny, Haute-Marne, France, have invented a new and useful Improvement in Hand-Shears for Cutting Sheet Metal and other Analogous Hard Materials, of which the following is a specification.

This invention consists in the novel construction of hand-shears hereinafter described and claimed, whereby a more effective operation is obtained, especially in cutting sheet metal and other hard substances and in making cuts on curved lines.

The invention is illustrated by the accompanying drawings, in which—

Figure 6:
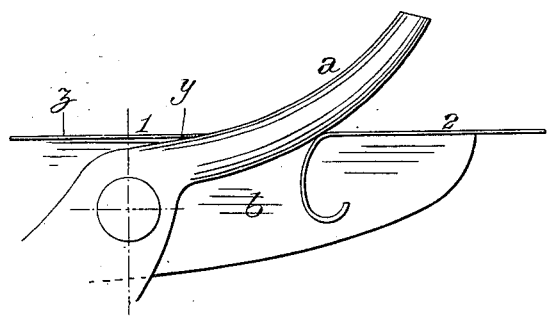

Figure 1 is a perspective view of the operative portions of the blades of a pear of shears of ordinary construction; Fig. 2, a similar view of the corresponding parts of a pair of shears embodying my invention; Fig. 3, a side view showing the blades open; Fig. 4, a side view showing the blades closed; Fig. 5, a transverse section through the line 5 5 of Fig. 4; Fig. 6, a side view of the blades of the same shears, illustrating the act of cutting a piece of sheet metal; and Fig. 7 a section on the line 1 2 of Fig. 6.

It is known that ordinary hand-shears do not permit of hard materials—such as sheet-zinc, tin, &c.—being properly cut to any desired curve. In fact, if with these shears it is desired to cut a sheet of metal of concave curve, for example, as shown in Fig. 1 of the drawings, the part $z$ of this sheet which is already cut will be brought to bear against the wide face $y$ of the upper blade, so that in order to be able to continue to effect the cut it is necessary to incline the shears in such a way as to permit of this part $z$ passing over the blade by bending or curling itself more or less; but the shears will then be in an absolutely unfavorable position for cutting, and can consequently only produce defective work. These hand-shears are, further, always difficult to employ for cutting hard materials, even when such cutting is to be effected in a straight line, because the force to be exerted by the workman increases rapidly as the point of cutting becomes farther and farther removed from the axis of articulation of the blades. This is the case for two reasons, the first being that even if the angle which the blades form during the cut remain constant the force to be exerted by the workman would always increase, on account of the variation of the relation between the arms of the lever, proportionately to the increase of the distance between the cutting-point $x$ and the axis of articulation $v$ of the blades. The second is that this cutting angle diminishes progressively during the closing of the blades, so that the force to be exerted further increases considerably from this fact. It is evidently the fact that the less this angle the more rapid the cut, and consequently the work to be effected in a given time increases considerably.

By my improved shears the two disadvantages above indicated are obviated. These shears (shown in Figs. 2, 3, 4, and 5) enable the cutting to be effected without bending or curling of the part $z$ of the sheet, even when following very accentuated concave curves in sheets of any hard material, from the fact that the upper blade is shaped in such a way that the metal cut can glide and pass over it without having to bend itself. Further, they render the cut in all cases easy, because, owing to the conformation of the upper blade, the force exerted for effecting the cut remains constant, the angle of the blades at the cutting-point increasing in proportion to the closing of the shears.

It will be seen that the upper blade $a$ instead of being high and flat and with a straight edge like the other blade $b$ is of less height and of lenticular section, so as to present to the side of the lower blade not a straight and vertical edge, but a convex inclined surface, over which that part $z$ of the sheet already cut can easily pass and slide. This it does without having to bend or curl, because that part of the upper blade which is behind the cutting-point descends beneath the level of the upper edge of the under blade by reason of the movement of the closing of the blades. This descent of the upper blade beneath the cutting edge of the other blade becomes particularly pronounced when this upper blade is curved or bent in the direction of its length, as shown in the drawings. It is also this curved form in the longitudinal direction which enables me to increase the angle which the blades form with the cutting-point as this point becomes farther and farther removed from the axis of articulation $c$. It will, in fact, be seen in Figs. 3 and 4 that the angle $d$, formed by the blades with the cutting-point when the shears are nearly closed, is greater than the angle $e$, which they form at the moment when they begin to cut.

Figure 7:
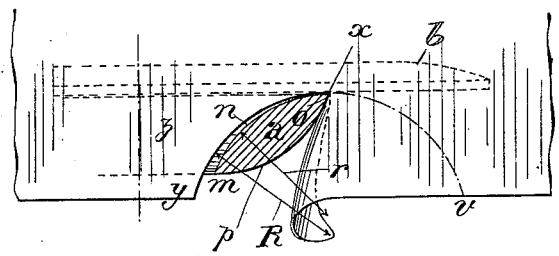

The cutting action is best illustrated by Figs. 6 and 7, the cut being made on the curved line $v\ x\ y$ in Fig. 7 having the radius R. The part $y\ x$ has been already cut, and the above-mentioned views show clearly that part $z$ of the plate from which the cut has been made resting flat on the straight edge of the blade $b$, because it has not been pushed aside by the blade $a$, but has been able to pass above the face of the blade $b$ without touching it. It may be understood by a simple inspection of Fig. 7 that the radius R, according to which the cut is made, cannot be less than the radius $r$ of the curvature $m\ n\ o$ of the inner surface of the blade $a$. If, then, this radius $r$ is very short, sheets may be cut on very accentuated concave curves. It will be understood, however, that my scissors may cut in straight lines or on convex curves. As to the external curvature $m\ p\ o$ of the blade $a$, it is selected to give the blade the desired thickness and solidity. It need not be the same as that of the internal surface.

I claim—

A pair of shears comprising in combination two articulated blades one of which has a straight edge and a flat inner face and the other of which has its inner face of lenticular transverse profile and at an inclination to the face of the straight blade, substantially as herein described.

In testimony that I claim the foregoing as my invention I have signed my name, in presence of two witnesses, this 1st day of July, 1899.

GEORGES THUILLIER.

Witnesses:
ALCIDE FABE,
GEORGES CABARY.